United States Patent [19]

Robinson et al.

[11] Patent Number: 4,739,008
[45] Date of Patent: Apr. 19, 1988

[54] BI-PHASE INITIATOR SYSTEM FOR WATER-IN-OIL EMULSION POLYMERS

[75] Inventors: Peter M. Robinson, Columbus; Nguyen Van-Det, Midland, both of Ga.

[73] Assignee: Exxon Chemical Patents Inc., Linden, N.J.

[21] Appl. No.: 932,542

[22] Filed: Nov. 18, 1986

[51] Int. Cl.⁴ .................................................. C08F 2/32
[52] U.S. Cl. .................................... 524/801; 526/81;
526/82; 526/86; 526/109; 526/219.5;
526/219.6; 526/262; 526/264; 526/286;
526/303.1; 526/328; 526/328.5;
526/330; 526/341
[58] Field of Search ...................... 524/801; 523/337;
526/81, 82, 86

[56] References Cited

U.S. PATENT DOCUMENTS

| | | | |
|---|---|---|---|
| 3,284,393 | 11/1966 | Vanderhoff et al. | 524/801 |
| 3,573,263 | 3/1971 | Gill | 526/817 |
| 3,951,925 | 4/1976 | Mishima et al. | 526/72 |
| 3,951,930 | 4/1976 | Downer et al. | 526/82 |
| 4,301,264 | 11/1981 | Moore et al. | 526/86 |

Primary Examiner—Joseph L. Schofer
Assistant Examiner—Angela L. Fugo
Attorney, Agent, or Firm—B. C. Cadenhead

[57] ABSTRACT

Water-in-oil emulsions of monomers which form water-soluble polymers are polymerized in the presence of a biphase initiator system containing both an oil-soluble initiator and a water-soluble initiator or activator or alternatively a water-soluble initiator and an oil-soluble activator which results in polymers having improved performance characteristics. In addition, the system permits the satisfactory polymerization of monomers which could not have been reproducibly polymerized.

17 Claims, No Drawings

BI-PHASE INITIATOR SYSTEM FOR WATER-IN-OIL EMULSION POLYMERS

This invention relates generally to water-soluble polymers which are dispersed as water-in-oil emulsions. More particularly, the present invention relates to water-in-oil emulsions of water-soluble polymers which are prepared by polymerization of a water-in-oil emulsion of the monomer using a biphase initiator system.

Water-in-oil emulsions containing water-soluble polymers dispersed therein are well-known in the art. Such emulsions have found a wide variety of uses, for example as flocculants in the mining and paper industries and in sewage treatment, and as mobility control agents in enhanced oil recovery. In view of the large quantities of the emulsions which are used in each of these applications, there is a continuing need to produce emulsions which provide improved performance to thereby reduce the quantity of emulsion needed or to obtain improved performance for a given amount of emulsion. As such, research continues to produce such improved emulsions and the biphase initiator system of the present invention is a result of such research.

In addition, many times the monomers which are to be polymerized in the emulsions contain impurities, such as aldehydes and/or their adducts, which make the reproducible polymerization thereof quite difficult. To overcome this in the past has required a separate pre-treatment of the monomers which was both expensive and time-consuming. By use of the biphase initiator system, such monomers have been reproducibly polymerized in water-in-oil emulsions without any pretreatment process.

The present invention entails polymerizing appropriate monomers in a water-in-oil emulsion utilizing a biphase initiator system which is a combination of either (i) an oil-soluble initiator together with a water-soluble initiator or a water-soluble activator for the oil-soluble initiator or (ii) a water-soluble initiator and an oil-soluble activator. While it is not definitely known why the biphase initiator system produces polymers with improved performance characteristics, it has been discovered that the system yields a smooth conversion profile with excellent control, even at very low initiator levels or in the presence of monomers of variable quality.

The Encyclopedia of Chemical Technology, Kirk-Othmer, Third Ed., Vol. 13, pp. 365–367, 1978, teaches that oil-soluble azo initiators "are not susceptible to radical-induced decompositions and their decomposition rates show only minor solvent effects, and are not affected by transition metals, acids, bases and other contaminants. Thus, azonitrile decomposition rates are predictable." As such, the reference teaches that the addition of a water-soluble initiator or activator in the present invention should have no effect upon an oil-soluble azo initiator. To the contrary, a dramatic difference in product performance has been discovered when polymers are prepared with the disclosed biphase initiator system in a water-in-oil emulsion polymerization.

The use of any initiator capable of generating free-radicals is, of course, well known in water-in-oil emulsions. Such initiators have included redox, azobisisobutyronitriles, peroxides, persulfates and the like as disclosed in such as U.S. Pat. Nos. 3,284,393, 3,624,019, 4,022,736, 4,217,262, 4,339,371 and many other similar such references. These references make no distinction among the free-radical sources, merely that one be present.

European Patent Appl. No. 0,119,078 discloses a dual initiator system for polymerizing a monomer water-in-oil emulsion, but the two initiators are generally of the same class and are added sequentially, i.e. one before polymerization commences and one thereafter. Thus one initiator is utilized to commence polymerization and then a second, less reactive initiator is used to complete the reaction.

U.S. Pat. No. 3,414,547, Thompson et al., discloses a similar dual initiator system for a conventional single phase solution polymerization. The reaction is commenced with a redox couple and then, after at least one-half of the exotherm has occurred, an organic azo compound is added to complete the reaction. The reference teaches, at col. 6–7, that the use of an azo initiator by itself should be avoided for such solution polymerizations since the resultant polymer has a tendency to become gummy and of substantially lower molecular weight than a polymer prepared with a redox initiator.

U.S. Pat. No. 3,573,263 takes the Thompson et al. teaching one step further with regard to aqueous solution polymerizations and adds the azo compound to the reaction mixture prior to the onset of polymerization. The amount of redox initiator utilized is stated to be "insufficient by itself to complete the polymerization of the monomeric material present in said solution." Thus, the azo compound is merely being used in the water-monomer-polymer system to reduce the residual free monomer content of the resultant polymer as was taught by Thompson et al and not to overcome adverse effects of low quality monomers.

German Offen. DE No. 3,241,198 (U.S. Ser. No. 344,087, Jan. 29, 1982) discloses that aldehyde impurities may be removed from acrylamide by passing the monomer through a weakly basic ion exchange resin containing primary or secondary amines.

European Pat. App. EP No. 65078 (U.S. Ser. No. 258,104, Apr. 27, 1981) discloses the use of borohydrides or boron hydride complexes to treat monomers prior to polymerization to reduce the acrolein content.

From the above discussion, it is apparent that none of the prior art has recognized that the performance of a water-in-oil emulsion polymer may be improved by altering the initiator system, nor that a more reproducible polymerization could result, nor that previously unacceptable monomers can be directly polymerized to yield acceptable/superior performing products.

It is accordingly an object of the present invention to produce water-in-oil emulsions of finely dispersed water-soluble polymeric particles in which the emulsions have improved flocculation performance.

It is a further object to produce reproducible emulsions when the initial monomers contain unacceptably high levels of impurities, e.g. aldehydes such as acrolein and/or its adducts.

It is a further object to improve the shelf-life of water-in-oil emulsions.

It is a futher object to improve the reproducibility of a water-in-oil emulsion polymerization to thereby allow improved product manufacturing control, i.e. tighter specifications.

These and other objects will become apparent from the ensuing description.

It has been discovered that the use of a biphase initiator system, with both portions thereof present prior to the commencement of polymerization, when utilized with a water-in-oil emulsion of monomers which will produce water-soluble polymers, will produce polymers having improved properties. The biphase initiator system comprises (i) an oil-soluble initiator and either a water-soluble initiator or a water-soluble activator for the oil-soluble initiator or (ii) a water-soluble initiator and the oil-soluble activator for the water-soluble initiator. Thus, the initiator system contains both an oil-soluble component and a water-soluble component wherein at least one of them is in fact an initiator.

The oil-soluble initiators useful in the present invention include both the symmetrical and unsymmetrical azonitrile and related azo compounds commonly used to generate free-radicals at temperatures ranging from about 40° C. to about 200° C. and which are predominately soluble in the oil phase of the emulsion. Suitable such compounds include, for example:

2,2'-azobis-(2-cyclopropylpropionitrile)
2,2'-azobis-(2,4-dimethylvaleronitrile)
2,2'-azobis-(2,4-dimethyl-4-methoxyvaleronitrile)
2,2'-azobis-(1-cyclooctanenitrile)
1,1'-azobis-3-chlorocumene
1,1'-azobis-4-chlorocumene
2,2'-azobis-2-(4-tolyl)propane
1,1'-azobis-1-(4-tolyl)cyclohexane
2,2'-azobis-(isobutyronitrile)
2,2'-azobis-2,4,4-trimethylvaleronitrile
2,2'-azobis-2-methylbutyonitrile
2,2'-azobis-2-ethylpropionitrile
1,1'-azobis-1-cyclopentanenitrile
2,2'-azobis-2,3-dimethylbutyronitrile
2,2'-azobis-2-methylvaleronitrile
2,2'-azobis-2-cyclobutylpropionitrile
1,1'-azobis-1-cyclohexanenitrile
2,2'-azobis-2-propyl-butyronitrile
2,2'-azobis-2,3,3-trimethylbutyronitrile
2,2'-azobis-2-methylhexylonitrile
2,2'-azobis-2-isopropylbutyronitrile
1,1'-azobis-1-cycloheptanenitrile
1,1'-azobis-1-(2-methylcyclohexane)-nitrile
1,1'-azobis-1-cyclohexanecarbonitrile
2,2'-azobis-2-isopropyl-3-methylbutyronitrile
2,2'-azobis-2-benzylpropionitrile
2,2'-azobis-2-(4-chlorobenzyl)propionitrile
2,2'-azobis-2-(4-nitrobenzyl)propionitrile
1,1'-azobis-1-cyclodecanenitrile
azobis-isobutyramidine
2,2'-azobis-methyl-2-methylpropanoate
azobis-(1-carbomethoxy-3-methylpropane)
2,2'-azobis-(ethyl-2-methylpropionate)
1,1'-azobis-1-chloro-1-phenylethane
1,1'-azobis-1-chloro-1-(4-bromophenyl)ethane
3,7'-diphenyl-1,2-diaza-1-cycloheptene
1,1'-azobis-cumene
2-(t-butylazo)-4-methoxy-2,4-dimethylpentanenitrile
2-(t-butylazo)-2,4-dimethylpentanenitrile
2-(t-butylazo)isobutyronitrile
2-(t-butylazo)-2-methylbutanenitrile and
1-(t-amylazo)cyclohexanecarbonitrile.

Other suitable oil soluble initiators useful herein include such as organic peroxides, hydroperoxides and percarbonates. Examples of these initiators include benzoyl peroxide, acetyl benzoyl peroxide, cyclohexanone peroxide, cyclohexyl hydroperoxide, cumene hydroperoxide, t-butyl hydroperoxide 2,4-dichlorobenzoyl peroxide, hydroxyl heptyl peroxide, isopropyl percarbonate, methyl ethyl ketone peroxide, peracetic acid, acetyl peroxide, t-butyl perbenzoate, di-t-butyl diperphthalate, methyl amyl ketone peroxide, methyl cyclohexyl hydroperoxide, diisobutyryl peroxide, t-butyl peracetate, t-butylperphthalic acid, p-chlorobenzoyl peroxide, dibenzal diperoxide, and di-t-butyl peroxide. In addition, oil soluble redox couples may also be used. Suitable such couples utilize oxidants such as benzoyl peroxide, lauroyl peroxide, cumene hydroperoxide and the like together with reductants such as ferrous ions, iron pyrophosphate-sorbose, dimethylaniline, thiourea, triethylborane, sodium sulfide, hydrazine, sodium formaldehyde sulfoxylate, amines and the like. In addition, dimethylaniline may be used with such as Ni(II) chloride, cupric nitrate, benzoyl peroxide, or benzoyl chloride. Similarly, dimethyl aniline-N-oxide may be utilized with benzoic anhydride, cobaltous salts, or tetracyanoquino-dimethane.

Of these oil-soluble initiators, the most preferable due to commercial availability are 2,2'-azobis(isobutyronitrile), 4,4'-azobis(4-cyanopentanoic acid), 2,2'-azobis-(2,4-dimethylvaleronitrile), t-butyl hydroperoxide, cumene hydroperoxide, benzoyl peroxide amnd lauroyl peroxide.

The water-soluble initiator component of the present invention is preferably either a redox couple or a water-soluble azo initiator. These initiators are well-known to the art. Examples of suitable water-soluble azo initiators include:

2,2'-azobis-(2-amidinopropane hydrochloride)
4,4'-azobis-(4-cyanopentanoic acid)
2,2'-azobis-(N-ethylamidinopropane hydrochloride)
2,2'-azobis-(N,N'-dimethyleneamidinopropane hydrochloride)
2,2'-azobis-(2-propane-2-carboxylic acid)
2,2'-azobis-(N,N'-dimethylene isobutyramidine)
2,2'-azobis-(isobutyramide)dihydrate
2,2'-azobis-(2-methyl-N-(2-hydroxyethyl))propionamide
2,2'-azobis-[2-methyl-N-(1,1-bis(hydroxymethyl)]propionamide, and
2,2'-azobis-[2-methyl-N-(1,1-bis(hydroxymethyl)-2-hydroxyethyl)]propionamide.

Examples of suitable redox couples, with the oxidizer component specified first, include (i) persulfate (peroxydisulfate) with bisulfite, metabisulfite, amines, thiols, ureas, ascorbic acid, ferrous or cobaltous ions, ferricyanide, nitrates, thiosulfates, silver ions, titanium ions, thioglycolic acid, 2-mercaptoethanol, cysteine, thioureas, hydrazides, hydrazine hydrate, cuprous ions or the like;

(ii) hydrogen peroxide with thiols, thioureas, hydroxylamines, ascorbic acid, sodium formaldehyde sulfoxylate, ferrous ions, cuprous ions, ammonia, aliphatic amines, nitrites, formic acid, acetic acid, nitrates, bisulfites, or the like;

(iii) t-butyl hydroperoxide with metabisulfite, sodium formaldehyde sulfoxylate, sulfur dioxide, sulfur trioxide, thioureas, ferrous ions, or the like;

(iv) bromates with sulfites, metabisulfites, thioureas, ferrous ions, isothioureas, thiosulfates, thioacetamides, thioglycolic acid, or the like;

(v) ferric ions with metabisulfites, thiols, thioureas, hydrazine, or the like;

(vi) $Mn^{+3}$ with alcohols, thiols, thiourea, reducing sugars, dimethylsulfoxide, hydrazine, dicarboxylic acids, acetylacetonate, or the like;

(vii) $Ti^{+3}$ with hydroxylamines;

(viii) $Ce^{+4}$, $Co^{+3}$, $V^{+5}$ or $Cr^{+6}$ with alcohols;

(ix) permanganates with thiols, aminoacids, hydroxyacids, or the like;

(x) $Cu^{+2}$ with hydrazine, ascorbic acid, amines, acetylacetonates, chitosan, vinylamino-vinylacetamide copolymer, alpha,omega-diaminoalkanes, imidazoles, polyvinylamine, bis-ephedrine, or the like;

(xi) perphosphate (peroxydiphosphate) with thiols, ascorbic acid, cobaltous ions, silver ions, $VO^{+2}$ ions, thiosulfates, thioacetamides, or the like;

(xii) chlorates with ferrous ions, bisulfites, or the like;

(xiii) chlorine, bromine or iodine with metal salts, thioureas, ammonia, amines, acetamide, dicyandiamide, malic acid, mercaptans, benzene-sulfinates, sulfonic acid, thioglycolic acid, mercaptoalcohols, or the like; and (xiv) N-halosuccinimide, N-haloamines, or N-haloacetamide with vanadyl sulfate, zinc chloride, or the like.

Preferred water-soluble redox initiators include the bromate-metabisulfite, chlorate-chlorite and peroxide-metabisulfite couples.

When an activator is used in place of the second initiator, it may be any of the single components of conventional redox couples, such as those specified above, provided that it is soluble in the oppsite phase to the initiator. The activator may be either of the oxidizing type or the reducing type. Preferred oxidizing activators include inorganic peroxysulfates, bromates or chlorates, hydrogenperoxide and organic peroxides or hydroperoxides. Preferred reducing activators include the salts of oxo acids of sulfur, organic thiols, hydrazine and its alkyl derivatives, and multivalent metal ions such as aluminum, iron, cerium and the like.

The oil-soluble azo initiator is generally used in amounts of about 10 to 10,000 ppm, preferably 100–2000 ppm, of the overall emulsion. It is generally dissolved in the oil phase as discussed below prior to forming the water-in-oil emulsion. Preferably, a portion of the azo initiator is withheld from the initial emulsion and is added, after polymerization has commenced, either continuously or incrementally.

The oxidant portion of the redox initiator is generally used in an amount of about 10 to 100 ppm of the overall emulsion and is usually dissolved in the aqueous phase as discussed below of the water-in-oil emulsion. Preferably the oxidant is used in an amount of about 25 to 200 ppm.

The reductant portion of the redox initiator is generally used in an amount of about 10 to 10,000 ppm of the overall emulsion. It may all be added to the emulsion at the commencement of the polymerization or, more preferably, some is added to initiate the polymerization and the balance is added continuously during the reaction.

When a water-soluble initiator, other than redox couple, is used, it is generally present in amounts of about 10 to 10,000 ppm of the overall emulsion.

When an activator is utilized in place of a second initiator the activator is generally used in the amounts specified above for the oxidant and reductant portions of the redox initiator.

Of course, more than the above stated amounts of oil-soluble initiator, water soluble initiator, and/or activator may be utilized if desired, but no benefit in so doing has been noted.

Although the present invention has been found to be independent of the particular emulsion polymerization method employed, certain preferences are delineated in the general description of emulsion preparation which follows.

A preliminary emulsion is made by homogenizing oil and aqueous phases. The oil phase of the emulsion, which generally comprises from about 5 to 35 percent by weight of the total emulsion, is comprised of one or more inert hydrophobic liquids. Preferably, the oil phase comprises about 20 to 30 percent of the emulsion. The oil used may be selected from a large class of organic liquids which are immiscible with water, including liquid hydrocarbons and substituted liquid hydrocarbons. Representative examples of such oils include benzene, xylene, toluene, mineral oils, kerosenes, naphthas, chlorinated hydrocarbons, such as perchloroethylene, and the like.

The oil phase also contains the primary surfactants, i.e. conventional emulsion polymerization stabilizers. Such stabilizers are well known to the art to promote the formation and stabilization of water-in-oil emulsions. Normally such emulsifiers have HLB values in the range of about 2 to about 10, preferably less than about 7. Suitable such emulsifiers include the sorbitan esters, phthalic esters, fatty acid glycerides, glycerine esters, alkanolamides as well as the ethoxylated and/or hydrogenated versions of the above and any other well known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated and/or hydrogenated versions thereof containing 1 to 10 moles of ethylene oxide per mole of the basic emulsifier. Thus any emulsifier may be utilized which will permit the formation of the initial emulsion and stabilize the emulsion during the polymerization reaction.

These primary surfactants are used alone or in mixtures and are utilized in as low amounts as is possible since an excess will not only increase the cost of the resultant emulsion but may also reduce the performance. As such, all of the primary surfactants should together be used in amounts not greater than 3% by weight of the total emulsion. Preferably the amount is not greater than 2%.

The aqueous phase generally comprises about 95 to 65 percent by weight of the emulsion. Preferably, it comprises about 80 to 70 percent thereof. In addition to water, the aqueous phase will contain the monomers being polymerized, generally in an amount of less than about 50 percent, preferably about 20 to about 40 percent, by weight of the total emulsion, and generally chain transfer agents and sequestrants. Alternatively, the chain transfer agents and sequestrants may be added to the system after the preliminary emulsion has been prepared.

Any monomers which, when polymerized or copolymerized, yield water-soluble polymers may be used in the present invention. The term "water-soluble" means that the polymer in soluble in water in an amount of at least 1% by weight. The polymer may be nonionic, amphoteric, anionic or cationic. Examples of monomers useful herein include acrylamide, acrylic acid and its salts, methacrylamide, diacetone acrylamide, methacrylic acid and its salts, maleic acid and its salts, methyl acrylate, ethyl acrylate, propyl acrylate, methyl methacrylate, ethyl methacrylate, vinyl acetate, dimethylaminoethyl acrylate and its methylchloride and methosulfate quaternaries, dimethylaminoethyl methacrylate and its methylchloride and methosulfate quaternaries, diethylaminoethyl acrylate and its methylchloride and methosulfate quaternaries, diethylaminoethyl methacrylate and its methylchloride and methosulfate quaternaries, hydroxyethyl acrylate, hydroxyethyl methacrylate, styrene, acrylonitrile, 2-acrylamido-2-methylpropane sulfonic or phosphonic acids and their salts, 3-(methacrylamido)-propyltrimethylammonium chloride, dimethylaminopropylmethacrylamide, isopropylaminopropylmethacrylamide, methacrylamidopropylhydroxyethyldimethylammonium acetate, vinyl methyl ether, vinyl ethyl ether, alkali metal and ammonium salts of vinyl sulfonic acid, vinyl pyridine, vinyl pyrrolidone, vinyl imidazole, diallyldimethylammonium chloride, styrene sulfonic acid and its salts, and the like. Preferably, the monomers are selected from acrylamide, acrylic acid and its salts, a quaternary of dimethylaminoethyl methacrylate, a quaternary of dimethylaminoethylacrylate, and 3-(methacrylamido)propyltrimethylammonium chloride. Most preferably the polymer is polyacrylamide, a copolymer of acrylamide and acrylic acid or its salts, or a copolymer of acrylamide and a quaternary of dimethylaminoethyl acrylate or methacrylate or 3-(methacrylamido)propyl-trimethylammonium chloride.

Any conventional chain transfer agent may be employed, such as propylene glycol, isopropanol, 2-mercaptoethanol, sodium hypophosphite, dodecyl mercaptan and thioglycolic acid. The chain transfer agent is generally present in an amount of about 0.1 to 10 percent by weight of the total emulsion, though more may be used.

Any conventional sequestrant may also be present in the aqueous phase, such as ethylenediaminetetraacetic acid or pentasodium diethylenetriamine pentaacetate or aminomethylene phosphonic acids. The sequestrant is generally present in an amount of about 0.01 to 2 percent by weight of the total emulsion, though more may be utilized.

Following preparation of the preliminary emulsion, polymerization of the monomers is commenced at a temperature sufficiently high to break down the initiators to produce the desired free radicals. Generally a suitable temperature is about −20° C. to 200° C. with a preferred temperature of about 0° C. to 100° C.

Preferably the polymerization is run at a pH of about 2 to 12 and a suitable amount of base or acid may be added to the preliminary emulsion to achieve the desired pH. The polymerization is usually completed in about an hour or two to several days, depending upon the monomers employed and other reaction variables. It is generally carried out at atmospheric pressure, but higher pressures are advantageously used when volatile ingredients are involved.

Following completion of the polymerization, the pH of the emulsion may be adjusted as desired. For an anionic polymer emulsion, this is generally about 2 to 10; for cationic emulsions about 2.0 to 7.0; and for non-ionic emulsions about 2.0 to 7.0. A breaker surfactant is generally added to yield a single package of final product. Any suitable breaker surfactant may be employed, experimentation being the best means of determining which breaker surfactant will perform optimally with a given emulsion system. Typical breaker surfactants include those having relatively high HLB numbers such as ethoxylated octyl and nonyl phenols, ethoxylated nonyl phenol formaldehyde resin, polyethylene oxide esters of fatty acids, dioctyl esters of sodium sulfosuccinate and others disclosed in U.S. Pat. No. 3,624,019 incorporated herein by reference. Typically, the breaker surfactant is added in an amount equal to about 0.5 to 6 percent by weight, based on the total emulsion. Preferably the amount is less than 3 percent and most preferably less than about 2.5 percent.

Once prepared, the emulsions of the present invention may be chemically modified in any known manner. "Chemically modified" is intended to cover further treatment of the dispersed water-soluble polymer and/or the addition of components to the dispersed water-soluble polymer which, without the stabilization provided by the emulsion stabilizers, would cause the normally water-soluble polymeric particles to coagulate or agglomerate. Examples of such further treatments are disclosed in U.S. Pat. Nos. 4,052,353 and 4,171,296, incorporated herein by reference. The emulsion of the present invention may also be concentrated in any suitable manner, such as is disclosed in U.S. Pat. No. 4,021,399, incorporated herein by reference.

The following examples are illustrative of the present invention, but are not in any way a limitation thereof. All parts are by weight unless otherwise specified.

EXAMPLE I

A water phase containing 200 g. of acrylamide, 200 g. of dimethylaminoethyl methacrylate methylsulfate quaternary, 3 g. ethylenediaminetraacetic acid, 0.2 g. of potassium bromate, and 269 g. of water is homogenized with an oil phase containing 240 g. of oil, 20 g. of sorbitan monooleate, 0.2 g. of 2,2'-azobis-(isobutyronitrile). The resultant emulsion system is then transferred to a suitable reaction vessel with stirring and is sparged with nitrogen. 3 g. of a 30% solution of sodium metabisulfite is added continuously during the polymerization and the temperature of the emulsion increases to about 35°–45° C. Cooling is provided to maintain this temperature and agitation is maintained for 6–10 hours. The polymerization is completed at the end of that time results in a cationic polyacrylamide emulsion.

To produce a self-inverting product, 24 g. of a breaker system composed of a 1.75:1 blend of the reaction product of nonylphenol with 6 moles of ethylene oxide and the reaction product of dinonylphenol with 24 moles of ethylene oxide is added.

EXAMPLE II

To evaluate the effectiveness of the above-prepared emulsion as compared to several other emulsions which were prepared in like manner but omitted either the oil-soluble azo initiator or the water-soluble bromate-bisulfite redox initiator at the commencement of the polymerization, or added the oil-soluble azo initiator after substantial conversion of the monomers to either maintain the conversion rate or to reduce residual monomer content, a conventional Buchner Funnel test was performed on sludge from the City of Detroit sewage treatment plant. The test is used to determine the relative effectiveness of various emulsions to dewater a sludge. It is performed by obtaining a representative sludge sample, dividing it into aliquots, adding the desired amount of the polymer being tested, conditioning the sludge by mixing the polymer solution in the sludge for 15 seconds at 450 rpm, pouring the conditioned sludge into a Buchner Funnel with moist filter paper, and then determining the drainage rate and amount of water removed.

When this is done with a series of polymeric emulsions which are prepared with either a single redox initiator or an azo initiator, or started with one type of initiator and then completed with the other type of initiator after substantial conversion has occurred, the polymers have standard viscosities of 2.8–3.8 cp and the maximum drainage after 15 seconds ranged from about 72 to 108 mls. The higher drainage occurs with polymers having the higher standard viscosities. These drainages occur at polymer dosages in the range of 25 to 35 pounds per ton. Increasing the dosage to 45 pounds per ton reduced the drainage due to overdosing.

When the Buchner Funnel test is done with the polymer of Example I, prepared with the bi-phase initiator system of this invention, which has a standard viscosity of 3.04 cp., there is no maximum noted in the drainage as it continues to increase as the polymer dosage increases to 45 pounds per ton. At 35 pounds, the drainage is about 105 mls; at 40 pounds, 120 mls; and at 45 pounds, 140 mls. Thus the bi-phase initiator system produces products which permit significantly higher drainages without the penalty of overdosing than are obtained with polymers prepared with a single-phase initiator or when the second phase initiator is added after substantial conversion of the monomers has occurred to complete the polymerization reaction.

EXAMPLE III

The procedure of Example I is repeated except that the cationic monomer is replaced by the methyl chloride quaternary of dimethylaminoethyl methacrylate (METAC) in varying amounts and the oil-soluble azo initiator is replaced by 2,2'-azobis-(2,4-dimethylvaleronitrile). In addition, only 10% of the azo initiator is initially added to the reaction with the balance being added in aliquots during the reaction. Thereafter, the procedure of Example II is repeated to compare the emulsions of this invention with ones prepared with solely a redox initiator. Sludge from the Puerto Rico Sewer and Aqueduct is used. The sludge volume in mls. is determined at 10 second intervals from 10 seconds to 60 seconds. The higher the sludge volume for a given time period the more effective is the emulsion in treating the sludge. The amounts of sludge produced in mls. were as follows:

TABLE I

| Initiator System | % METAC | Time (sec) | | | | | |
|---|---|---|---|---|---|---|---|
| | | 10 | 20 | 30 | 40 | 50 | 60 |
| Biphase | 30 | 90 | 100 | 107 | 112 | 115 | 116 |
| Biphase | 28 | 90 | 98 | 105 | 110 | 112 | 112 |
| Redox only | 34 | 66 | 82 | 90 | 94 | 100 | 102 |
| Redox only | 30 | 50 | 64 | 70 | 72 | 72 | 72 |

It is thus apparent that the use of the biphase initiator system greatly increases the sludge dewatering capacity of an emulsion as compared to a conventionally prepared emulsion. This is especially surprising in view of the reduced amount of METAC since it is known that reducing the amunt of quaternary component will generally reduce the dewatering efficiency of otherwise equivalent products.

EXAMPLE IV

The basic procedure of Examples I and II are repeated except that the cationic monomer is 3-(methacrylamido)propyl-trimethylammonium chloride and the amount reduced to 2.5 mole percent. A Buchner Funnel test using paper waste sludge from Finch Pruyn Company showed the following amounts of filtrate (mls) as a function of time:

TABLE II

| Initiator | Time (sec) | | | |
|---|---|---|---|---|
| | 10 | 20 | 30 | 40 |
| Biphase | 120 | 152 | 170 | 174 |
| Redox only | 100 | 120 | 132 | 138 |

Thus, the use of the biphase initiator system produced a 25% increase in the amount of filtrate removed from the sludge with quicker initial water release.

EXAMPLE V

The basic procedure of Example I is repeated to produce anionic polymers, i.e. the cationic monomer is replaced by the desired amount of acrylic acid which is then neutralized with sodium hydroxide prior to polymerization. The initiators utilized are as stated in Table III below as is the amount of acrylic acid. The oil-soluble azo initiator utilized is 2,2'-azobis(isobutyronitrile) and the water-soluble redox couple is potassium bromate-sodium metabisulfite.

The resultant polymers are then evaluated using cylinder setting tests on the refuse thickener feed of a coal preparation plant by determining the settling rate in inches per minute as a function of polymer dosage in ppm. The feed contains 3% solids and has a pH of 7.9.

The polymers tested, the initiators utilized, and the results are:

TABLE III

| Initiator | Settling Rates % Acrylic Acid | Dosage (ppm) | | |
|---|---|---|---|---|
| | | 3.0 | 4.0 | 5.0 |
| Biphase | 25 | 7.8 | 10.8 | 13.9 |
| Water-Soluble Redox only | 25 | 6.6 | 8.4 | 10.0 |
| Oil-Soluble Azo only | 25 | 6.6 | 8.4 | 10.0 |
| Biphase (1) | 25 | 7.7 | 10.9 | 13.8 |

(1) No potassium bromate was used, i.e., activation provided by sodium metabisulfite.

EXAMPLE VI

The procedure of Example I is repeated to produce an acrylamide homopolymer water-in-oil emulsion. The azo initiator tested is 2,2'-azobis-(isobutyronitrile) and the redox system is potassium bromate and sodium metabisulfite. The resultant polymer emulsion is stable for over 6 months with little or no deterioration in the standard viscosity of the polymer.

When the procedure is repeated with either a single oil-phase or water-phase initiator, substantial gel formation is observed in less than 3 months, accompanied by a significant loss in the standard viscosity of the product. In addition, the single initiator regimes did not obtain the desired target molecular weight reproducibly on various alternate supplies of acrylamide monomer.

EXAMPLE VII

This example shows the effect of the biphase initiator system on monomers containing excessive amounts of aldehydes and/or aldehyde adducts.

(a) A sample of acrylamide monomer which is found to contain 500 to 1000 ppm of total aldehydes is polymerized in accordance with the basic procedure of Example I except that no azo initiator is present in the initial emulsion. Process control and product replication was unacceptable. The resultant polymers were found to have standard viscosities in the range of 4.5 to 5.5 cps, 0.2 to 0.5% unreacted acrylamide monomer, and had very erratic polymerization profiles requiring air quenching to eliminate runaway conditions. In addition, gel counts were non-reproducible and unacceptably high. Gels are non-linear polymers which form and are undesirable in the uses of these polymers stated above.

(b) When (a) is repeated but the azo initiator is incorporated into the original emulsion, the resultant polymer had a standard viscosity of 6.0±0.2 cps, less than 0.05% unreacted monomer, and a smooth linear conversion profile. When the polymerization is repeated with alternate supplies of acrylamide containing from less than 100 ppm to 2500 ppm of total aldehydes, essentially the same high quality product was generated. This shows the increased reproducibility which can be obtained with the present invention.

EXAMPLE VIII

The procedure of Examples I and II are repeated except that the water-soluble redox initiator is replaced by the following activators:
(a) potassium bromate-oxidant
(b) t-butyl hydroperoxide-oxidant
(c) sodium metabisulfite-reductant
(d) hydrazine-reductant The polymeric emulsions show substantially equivalent performance to the bisphase initiator system of Example I, and superior performance to emulsions prepared with either a water-soluble initiator or an oil-soluble azo initiator.

What is claimed is:

1. A process for preparing a stable water-in-oil emulsion of a water-soluble polymer or copolymer having improved performance characteristics comprising polymerizing the corresponding monomer or monomers in a water-in-oil emulsion and in the continuous presence of a biphase initiator system which comprises (i) an oil-soluble initiator and a water-soluble initiator, or (ii) an oil-soluble initiator and a water-soluble activator, or (iii) a water-soluble initiator and an oil-soluble activator.

2. The process of claim 1 wherein the water-soluble polymer is a polymer or copolymer comprised of monomers selected from acrylamide, acrylic acid and its salts, methacrylamide, diacetone acrylamide, methacrylic acid and its salts, maleic acid and its salts, methyl acrylate, ethyl acrylate, propyl acrylate, methyl methacrylate, ethyl methacrylate, vinyl acetate, dimethylaminoethyl acrylate and its methylchloride and methosulfate quaternaries, dimethylaminoethyl methacrylate and its methylchloride and methosulfate quaternaries, diethylaminoethyl acrylate and its methylchloride and methosulfate quaternaries, diethylaminoethyl methacrylate and its methylchloride and methosulfate quaternaries, hydroxyethyl acrylate, hydroxyethyl methacrylate, styrene, acrylonitrile, 2-acrylamido-2-methylpropane sulfonic or phosphonic acids and their salts, 3-(methacrylamido)propyl-trimethylammonium chloride, dimethylaminopropylmethacrylamide, isopropylaminopropylmethacrylamide, methacrylamidopropylhydroxyethyldimethylammonium acetate, vinyl methyl ether, alkali metal and ammonium salts of vinyl sulfonic acid, vinyl pyridine, vinyl pyrrolidone, vinyl imidazole, diallyldimethylammonium chloride, styrene sulfonic acid and its salts, or mixtures thereof.

3. The process of claim 1 wherein at least one of the initiators is an azo initiator.

4. The process of claim 3 wherein the azo initiator is selected from the group consisting of:
2,2'-azobis(isobutyronitrile),
2,2'-azobis-(N,N'-dimethyleneisobutyramidine dihydrochloride),
2,2'-azobis(2-amidinopropane hydrochloride),
4,4'-azobis(4-cyanopentanoic acid),
2,2'-azobis(2,4-dimethylvaleronitrile),
2,2'-azobis-(N-ethylamidinopropane hydrochloride),
2,2'-azobis-(N,N'-dimethyleneamidinopropane hydrochloride), and
2,2'-azobis(2-propane-2-carboxylic acid).

5. The process of claim 1 wherein the biphase system comprises an oil-soluble azo initiator and a water-soluble redox initiator couple.

6. The process of claim 5 wherein the reductant portion is selected from the group consisting of sodium sulfite, sodium bisulfite, sodium metabisulfite, thiourea, hydrazine, N,N-dimethylaniline, thioglycolic acid and 2-mercaptoethanol.

7. The process of claim 5 wherein the oxidant portion is selected from the group consisting of sodium persulfate, potassium persulfate, ammonium persulfate, sodium chlorate, potassium chlorate, sodium bromate, potassium bromate, t-butyl hydroperoxide, cumene hydroperoxide, benzoyl peroxide, lauroyl peroxide and hydrogen peroxide.

8. The process of claim 3 wherein a portion of the oil-soluble azo initiator is withheld from the monomeric water-in-oil emulsion and is added during the polymerization reaction.

9. The process of claim 5 wherein the reductant is added continuously during the polymerization reaction.

10. The process of claim 1 wherein the polymerization is performed at a temperature of about −20° C. to about 200° C.

11. The process of claim 1 wherein the oil-soluble initiator is used in an amount of about 10 to 10,000 ppm of the emulsion.

12. The process of claim 5 wherein the oxidant is used in an amount of about 10 to 1000 ppm of the emulsion.

13. The process of claim 5 wherein the reductant is used in an amount of about 10 to 10,000 ppm of the emulsion.

14. The process of claim 1 wherein the biphase system is an oil-soluble initiator and a water-soluble activator.

15. The process of claim 14 wherein the activator is used in an amount of about 10 to 10,000 ppm of the emulsion.

16. The process of claim 14 wherein the activator is an oxidant.

17. The process of claim 14 wherein the activator is a reductant.

* * * * *